United States Patent [19]

Kalotay

[11] 4,088,022
[45] May 9, 1978

[54] TURBINE FLOWMETER AND COMPONENTS THEREOF

[75] Inventor: Paul Z. Kalotay, Monrovia, Calif.

[73] Assignee: International Telephone and Telegraph Corporation, New York, N.Y.

[21] Appl. No.: 553,024

[22] Filed: Feb. 25, 1975

[51] Int. Cl.² .............................................. G01F 1/115
[52] U.S. Cl. ................................................. 73/231 R
[58] Field of Search .................. 73/229, 231, 517; 307/295; 328/140; 331/65, 181

[56] References Cited

U.S. PATENT DOCUMENTS

| | | | |
|---|---|---|---|
| 2,325,927 | 8/1943 | Wilbur | 73/231 |
| 2,697,594 | 12/1954 | Stanton | 73/517 |
| 3,101,615 | 8/1963 | Pavone | 73/231 |
| 3,177,711 | 4/1965 | Ham et al. | 73/231 |
| 3,455,162 | 7/1969 | Michener | 73/231 |
| 3,567,959 | 3/1971 | Kaneko | 307/295 X |
| 3,694,776 | 9/1972 | Linder | 307/295 |
| 3,756,081 | 9/1973 | Young | 331/65 |
| 3,851,242 | 11/1974 | Ellis | 331/65 |

*Primary Examiner*—Herbert Goldstein
*Attorney, Agent, or Firm*—A. Donald Stolzy

[57] ABSTRACT

A turbine flowmeter with an unusual radio frequency pick-up and non-magnetic, conductive turbine blades. The pickup includes a coil which is also a part of a tank circuit of an input oscillator. A phase lock loop is then employed which receives, as an input, the output of the input oscillator. When a turbine blade passes the pick-up, the input oscillator undergoes a frequency shift. Circuits connected from the phase lock loop output then produce pulses which are counted and indicated. The circuits may be constructed to cause an indicator to read in units of volume, i.e. the total volume flow through the flowmeter, if desired. The said circuits include two active filters, a Schmitt trigger, a current converter and an output circuit from the phase lock loop output.

4 Claims, 13 Drawing Figures

TURBINE FLOWMETER AND COMPONENTS THEREOF

BACKGROUND OF THE INVENTION

This invention relates to flowmeters, and more particularly to a turbine flowmeter having considerable versatility without any electromagnetic rotor drag or stalling tendencies.

In the past the pick-up of a turbine flowmeter has been constructed of an inductive winding about an axis of symmetry and about a permanent magnet core. The prior art flowmeter is then provided with a non-magnetic conduit or cylindrical tube through which the fluid flows. The pick-up is fixed to the tube with the pick-up axis normal to the tube axis. An inclined plural blade rotor is then mounted inside the tube at a position along the length thereof where the pick-up is located. Each rotor blade is made of a ferromagnetic material and thus induces a voltage pulse in the winding as each blade passes the winding. Sometimes the blades are permanently magnetized in addition to or in lieu of the core magnetization. In any case, the number of pulses so generated is then approximately proportional to the total volume flow through the tube. Uses for this type of instrument as meters and otherwise are set forth in U.S. Pat. Nos. 3,756,079 and 3,842,655. By this reference hereto, the entire contents of said U.S. Pat. Nos. 3,756,079 and 3,842,655 are incorporated herein as though fully set forth hereat.

Notwithstanding the utility of conventional turbine flowmeters, they have several very serious disadvantages. In the first place, the magnetization of the core or blades causes an error producing drag on the rotor because of the magnetic force of attraction between the ferromagnetic rotor blades and the ferromagnetic core especially at low flow rates. Moreover, at certain low flow rates, the rotor actually stalls and completely fails to generate any pulses because of the said magnetic force of attraction. In other words, the meter completely fails to operate.

Still another very serious disadvantage of conventional turbine flowmeters is that the rotor blades thereof must always be made of a ferromagnetic material which may be incompatible with the fluid, the flow of which is to be metered. The rotor blades may thus, for example, be corroded or eaten away entirely.

SUMMARY OF THE INVENTION

In accordance with the present invention, the above-described and other disadvantages of the prior art are overcome by providing non-magnetic, conductive rotor blades for a turbine flowmeter. The pick-up coil is then connected in the tank circuit of an input oscillator. The input oscillator undergoes a frequency shift each time a rotor blade passes the pick-up. The number of these frequency shifts per unit time is then detected and is directly proportional to the fluid volume flow rate through the flowmeter.

The present invention thus has no rotor drag and does not stall at any flow rate, low or high, because the rotor blades are non-magnetic and there is no magnetic force of attraction between any of the rotor blades and the core.

The turbine flowmeter of the present invention can also accommodate a much wider variety of fluids than those of the prior art because the rotor blades of the invention may be made of many different non-magnetic, conductive materials compatible with many more fluids than the ferromagnetic rotor blades of the prior art. The prior art problem of corrosion or other prior art problems of compatibility may thus often, if not always, be eliminated.

Another feature of the present invention resides in the use of a movable non-magnetic, conductive member to generate a pulse.

Yet another feature of the present invention resides in a special pick-up geometry.

Still another feature of the present invention resides in means for converting a frequency shift to a voltage and/or current pulse.

The above-described and other advantages of the present invention will be better understood from the following detailed description when considered in connection with the accompanying drawings.

BRIEF DESCRIPTION OF THE DRAWINGS

In the drawings which are to be regarded as merely illustrative:

FIG. 1 is a longitudinal sectional view, partly in elevation, of a portion of a turbine flowmeter constructed in accordance with the present invention;

FIG. 2 is a longitudinal sectional view, partly in elevation, of a portion of the structure shown in FIG. 1;

FIG. 4 is a broken away top plan view of a bladed rotor shown in FIGS. 1, 2 and 3;

FIG. 5 is an enlarged vertical sectional view of a turbine flowmeter pick-up constructed in accordance with the present invention;

FIG. 6 is a bottom plan view of a ferromagnetic core illustrated in FIG. 5;

FIG. 7 is a side elevational view of the core shown in FIG. 6;

DESCRIPTION OF THE PREFERRED EMBODIMENT

A pipe or tube 10' is shown in FIG. 1. The internal dimensions of tube 10' may be identical, if desired, to that shown in the said patent. The structure shown inside tube 10' may be identical to that shown in the said patent, i.e. except for the material of rotor blades 28.

In accordance with the present invention, a sleeve 20 is threaded part way into the wall of tube 10'. Sleeve 20 may be made out of metal, but the material thereof is not critical to the invention. Sleeve 20 has a hexagon surface 21 by which it may be loosened, i.e. unscrewed from tube 10'. In general, sleeve 20 is inserted or threaded into tube 10' so that it is finger tight.

A ferrule 22 is fixed inside the upper end of sleeve 20 to receive an electrical connector, not shown. The electrical connector may be fixed relative to ferrule 22 and- /or sleeve 20. Sleeve 20 is hollow and has a uniform inside diameter throughout its length. It has substantially concentric internal and external cylindrical surfaces interrupted only by an external thread 23 which is turned into a similar thread 24 in a recess 25 in tube 10'. A ferromagnetic core 26 is fixed to sleeve 20, at the bottom thereof, as shown in FIG. 1.

Inside tube 10', a turbine flowmeter rotor 27 is rotatably mounted and has non-magnetic conductive blades 28 which pass adjacent core 26 as rotor 27 rotates.

As is well known, the central plane through the center of blades 28 cannot pass exactly through the axis of rotation of rotor 27 but must be turned at least at a slight angle in order for axial flow through tube 10' to cause rotor 27 to rotate. Blades 28 may thus be disposed at an angle A shown in FIG. 4. However, they do pass ferromagnetic core 26 shown in FIG. 1.

FIG. 2 is a slightly more detailed and enlarged view of a portion of the structure inside tube 10', the structure shown in FIG. 2 being identical to that shown in the said patent, i.e. except for the material of rotor blades 28.

Figure 3:
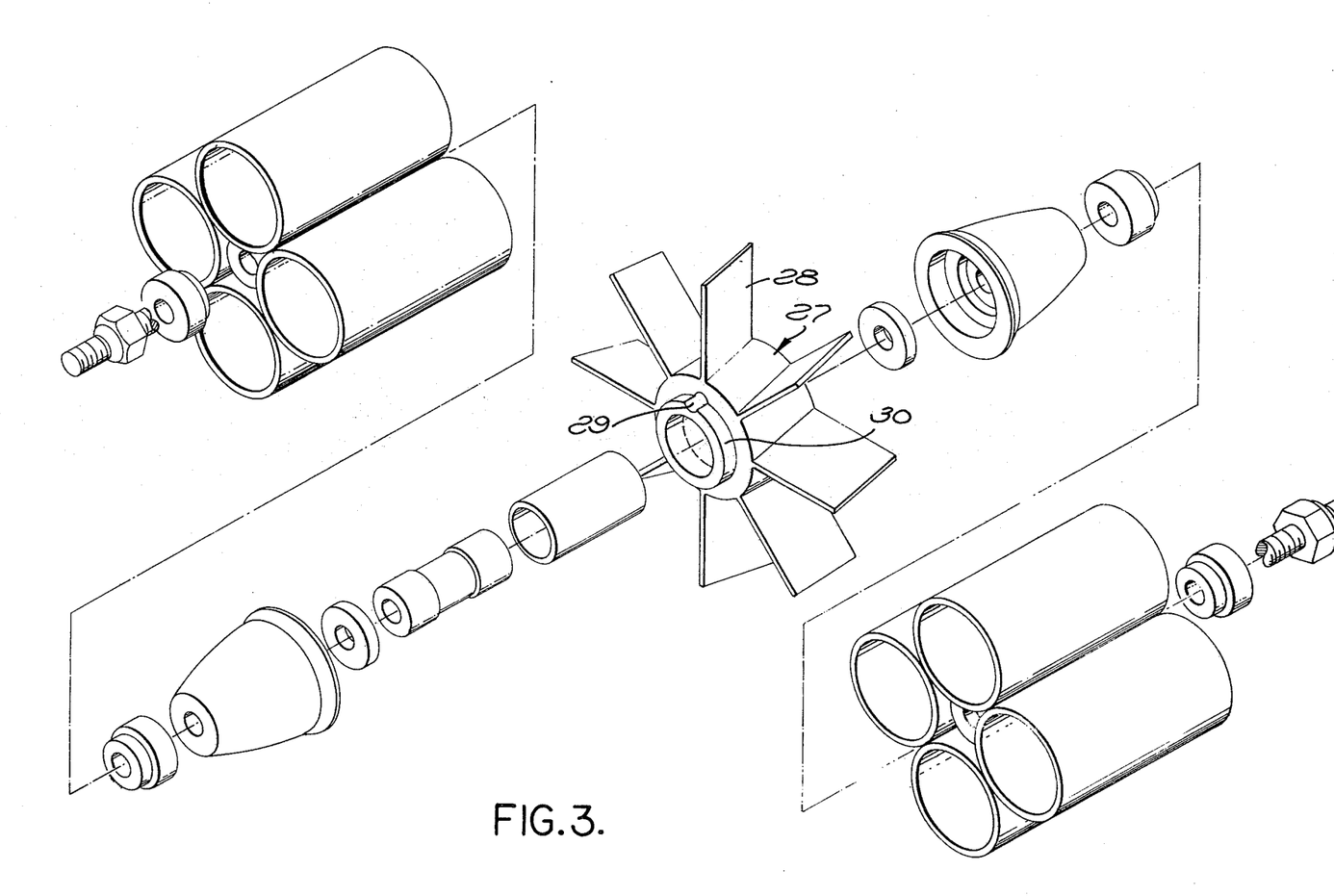
FIG. 3 is an exploded perspective view of a portion of the structure which is employed in FIG. 1.

FIG. 3 is an exploded perspective view of all the structures contained in tube 10'. All these structures are described in detail in the said patent, and reference thereto is hereby made should further information regarding the same be of interest. As shown in FIGS. 2, 3 and 4, rotor 27 has a boss 30 on each end thereof, and a hole 29 extends completely through rotor 27 and partly interrupts the external cylindrical surfaces of each of the bosses 30.

The pick-up of the present invention is shown in a vertical section in an enlarged view in FIG. 5. In this case, core 26 is shown in section with a cylindrical coil 31 mounted therein, coil 31 having output leads 32 and 33 for connection to the aforesaid electrical connector, not shown.

Figure 8:
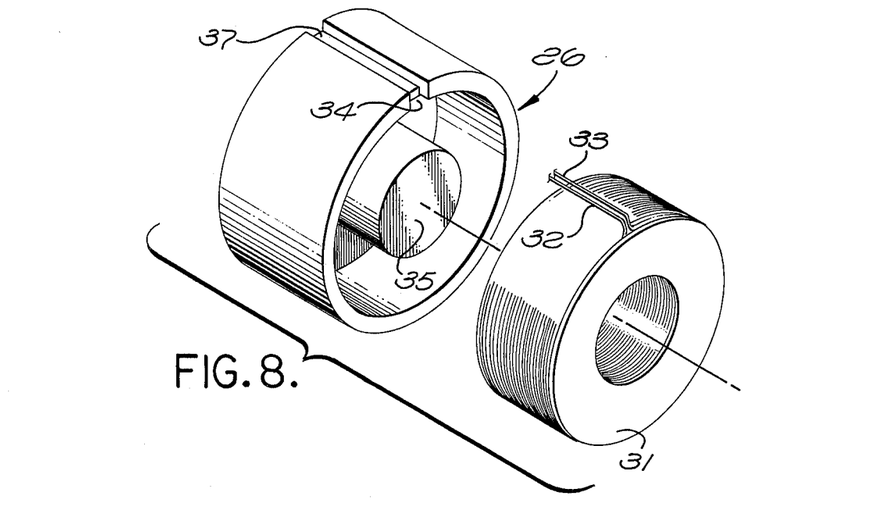
FIG. 8 is an enlarged exploded perspective view of a pick-up coil and core therefor constructed in accordance with the present invention.

As shown in FIG. 6, core 26 includes a groove 34 in the top thereof, a cylindrical projection 35 fixed to an annular bottom surface 36 internally thereof, and an axial groove 37. See also FIGS. 7 and 8.

Figure 9:
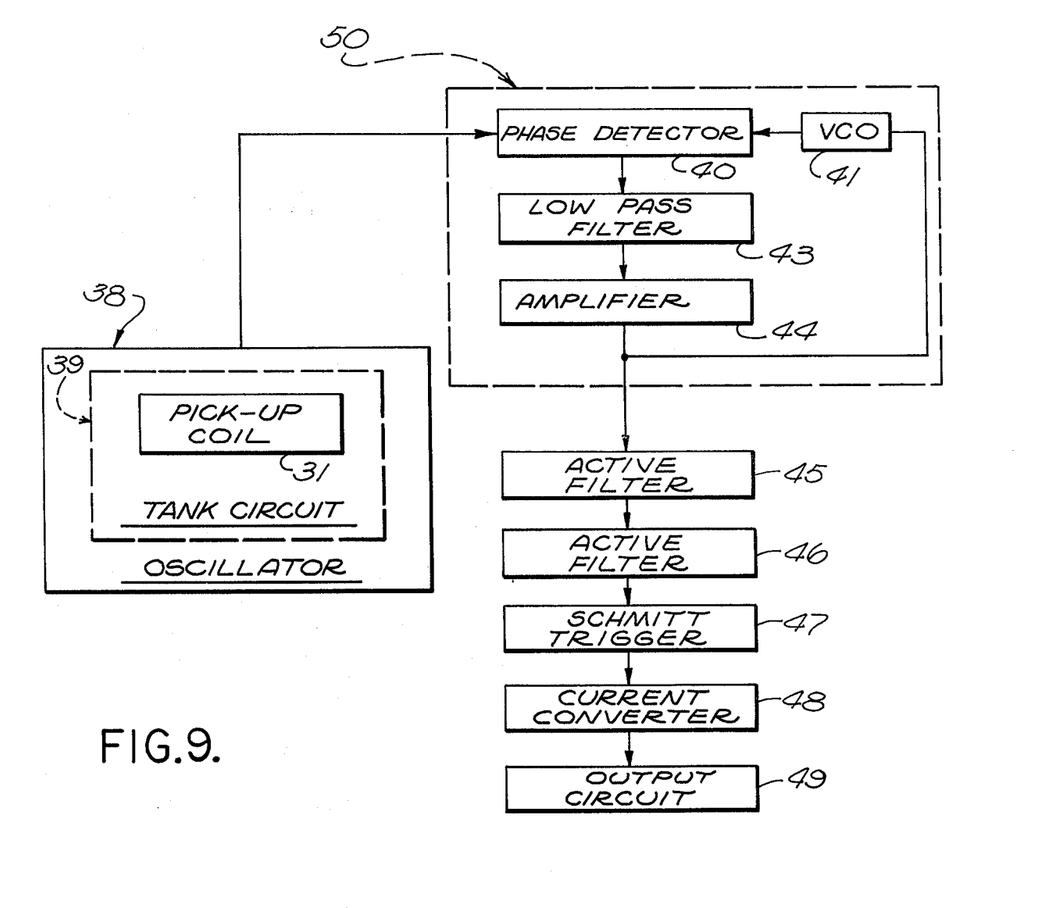
FIG. 9 is a block diagram of the flowmeter of the present invention.

The turbine flowmeter of the present invention is illustrated in FIG. 9 including an input oscillator 38 having a tank circuit 39 of which pick-up coil 31 is a part. The output of oscillator 38 is connected to an input of a phase lock loop 50 including a phase detector 40 having a second input from a voltage controlled oscillator (VCO) 41. The output of phase detector 40 is then connected to a series of circuits including a low pass filter 43, an amplifier 44, a first active filter 45, a second active filter 46, a Schmitt trigger circuit 47, a current converter 48, and an output circuit 49 which are connected in succession in that order from the output of phase detector 40. The VCO 41 is also connected from the output of amplifier 44.

OPERATION

In the operation of the turbine flowmeter of the present invention illustrated in FIG. 9, when, for example, a turbine blade 28 is stationary and spaced from the center of core projection 35 and from core 26 and coil 31, oscillator 38 will oscillate at a substantially constant frequency dependent upon the components thereof including pick-up coil 31. In this case, the output of amplifier 44 will be a substantially constant D.C. or zero voltage.

When a turbine rotor blade 28 rotates continuously and passes core 26 and coil 31, for one or more reasons, one of which will be explained hereinafter, oscillator 38 undergoes a frequency shift for each such pass. The output of amplifier 44 is then modulated during each pass. The shift of the frequency of oscillator 38 during a pass therefore produces a modulation and/or pulse at the outputs of each of the boxes 43 to 49 shown in FIG. 9. If the output circuit 49 is properly calibrated and provided with a pulse counter and an indicator, the indicator may register total volume flow through tube 10'. In other words, the indicator may register total flow in units of volume.

Figure 10:
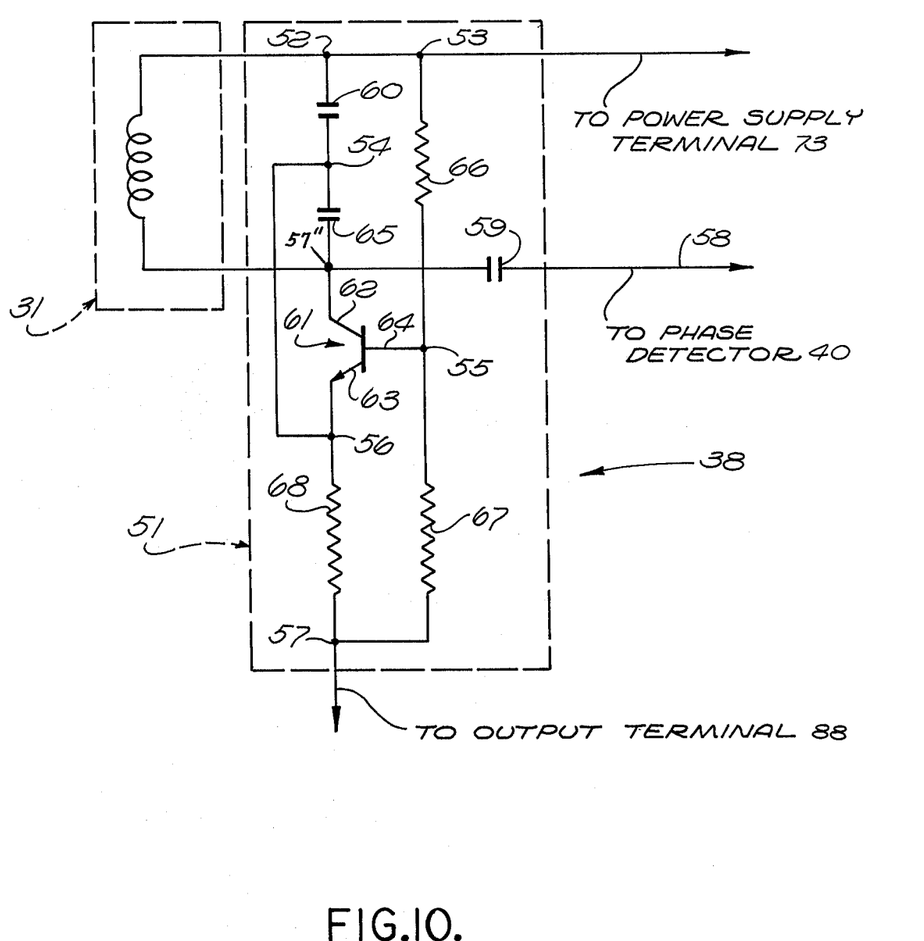
FIG. 10 is a schematic diagram of two component parts of the flowmeter illustrated in FIG. 9.

Oscillator 38 is again shown in FIG. 10 including pick-up coil 31 and a circuit 51. Circuit 51 has junctions 52, 53, 54, 55, 56, 57 and 57''. Oscillator 38 has an output lead 58. A capacitor 59 is connected from one end of coil 31 to output lead 58 through junction 57''. The other end of coil 31 is connected to junction 52. A capacitor 60 is connected between junctions 52 and 54. A transistor is provided at 61 including a collector 62, an emitter 63 and a base 64. A capacitor 65 is connected from junction 54 to collector 62 through junction 57''. Emitter 63 is connected to junction 56. Junctions 54 and 56 are connected together. A resistor 66 is connected between junctions 53 and 55. A resistor 67 is connected between junctions 55 and 57. A resistor 68 is connected between junctions 56 and 57.

Figure 11:
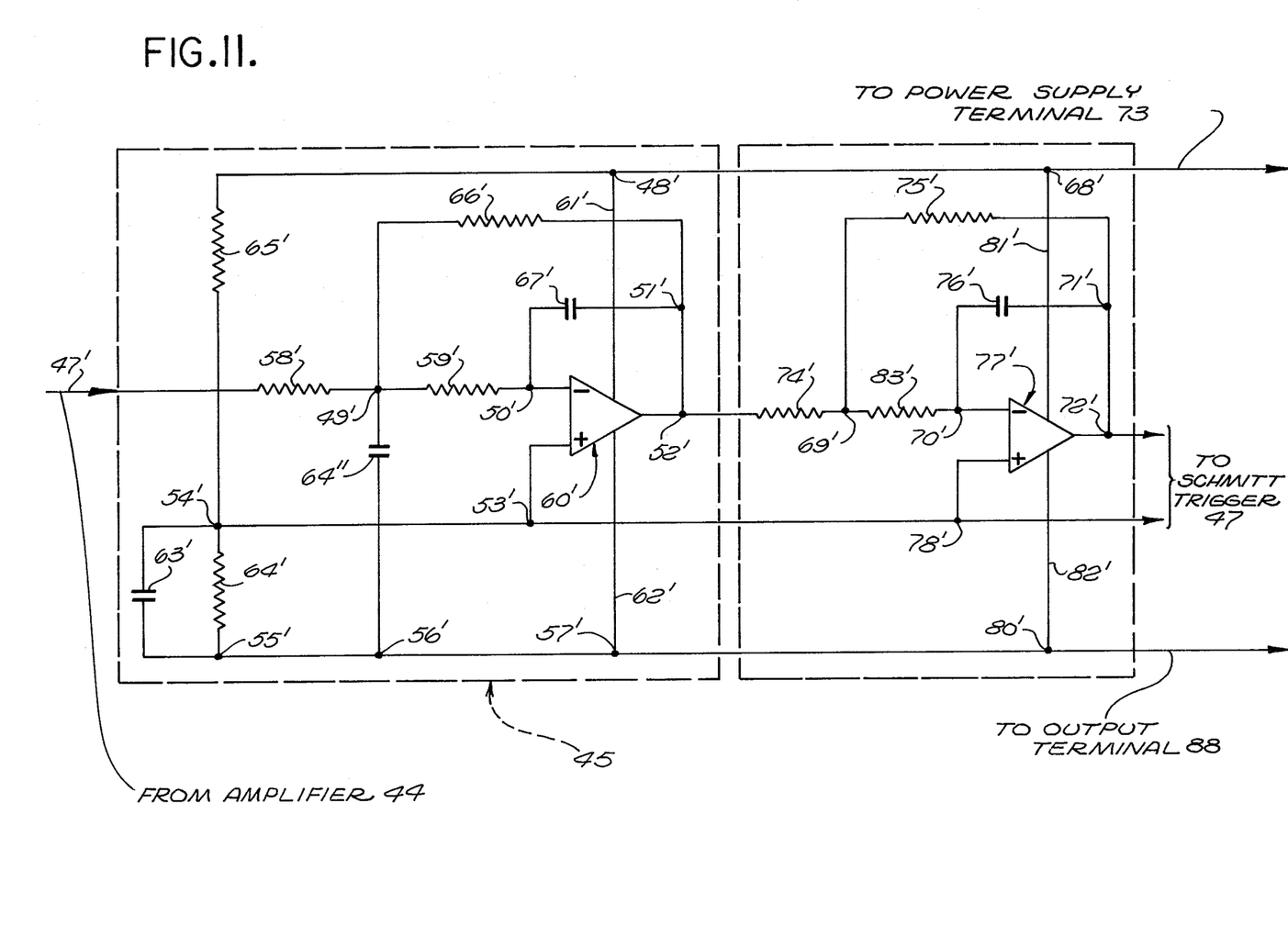
FIG. 11 is a schematic diagram of two more component parts illustrated in FIG. 9.

Filters 45 and 46 are illustrated in FIG. 11. Filter 45 has an input lead 47'. Filter 45 has junctions 48', 49', 50', 51', 52', 53', 54', 55', 56' and 57'. A resistor 58' is connected between input lead 47' and junction 49'. A resistor 59' is connected between junctions 49' and 50'. An amplifier is provided at 60' having positive and negative power input leads 61' and 62', respectively. Lead 61' is connected to junction 48'. Lead 62' is connected to junction 57'. A capacitor 63' is connected between junctions 54' and 55'. A resistor 64' is also connected between junctions 54' and 55'. A capacitor 64'' is connected from junction 49' to junction 56'. Junctions 53' and 54' are connected together. Junctions 55', 56' and 57' are also connected together. A resistor 65' is connected between junctions 48' and 54'. A resistor 66' is connected between junctions 49' and 51'. A capacitor 67' is connected between junctions 50' and 51'. Junctions 51' and 52' are connected together. The inverting input of amplifier 60' is connected from junction 50'. The noninverting input of amplifier 60' is connected from junction 53'. The output of amplifier 60' is connected to junction 52'.

Filter 46 has junctions 68', 69', 70', 71' and 72'. Junction 68' is connected from junction 48' in filter 45 to a power supply terminal 73' shown in FIG. 12. A resistor 74' in filter 46 is connected from junction 52' to junction 69'. A resistor 75' is connected between junctions 69' and 71'. A capacitor 76' is connected between junctions 70' and 71'. Junctions 71' and 72' are connected together.

Figures 12, 13:
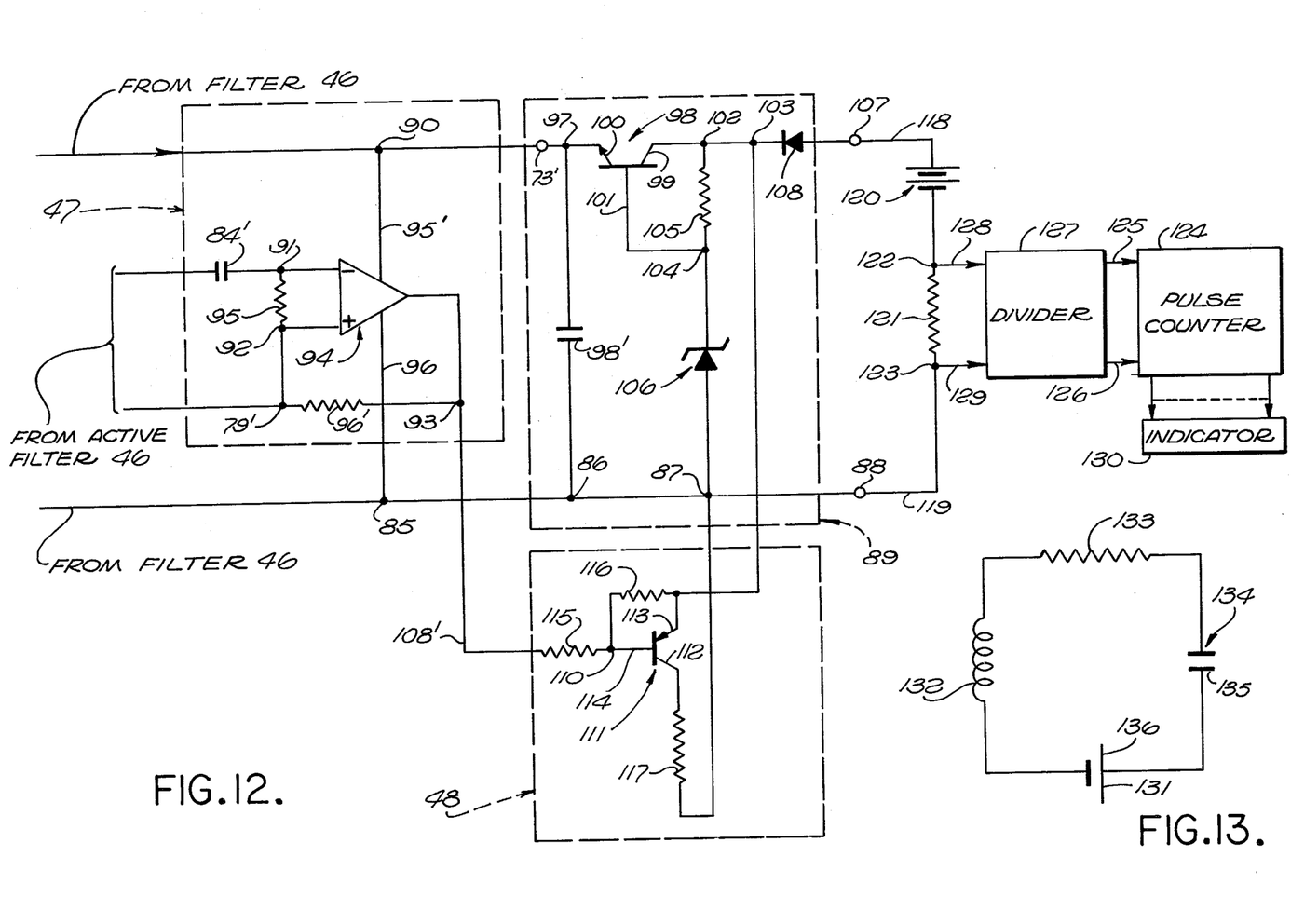
FIG. 12 is a schematic diagram of three component parts illustrated in FIG. 9.
FIG. 13 is a schematic diagram of a simple conventional circut embodying a ringing circuit.

Filter 46 has an amplifier 77' with an inverting input connected from junction 70', a noninverting input connected from a junction 78' which is also connected from junction 53' to a junction 79' in Schmitt trigger 47 shown in FIG. 12.

Filter 46 also has a junction 80'. Amplifier 77' has a positive power input lead 81', and a negative power input lead 82' connected from junctions 68' and 80', respectively. A resistor 83' is connected between junctions 69' and 70'.

The output of amplifier 77' is connected to junction 72' which, in turn, is connected to a capacitor 84' in Schmitt trigger 47.

Junction 80' is connected from junction 57' to a junction 85 which, in turn, is connected to junctions 86, 87 and an output terminal 88 shown in FIG. 13, junctions 86 and 87 being connected in the circuit of a power supply 89.

In FIG. 12, junction 68' of filter 46 in FIG. 12 is connected to power supply terminal 73' through a junction 90 in Schmitt trigger 47. Capacitor 84' in Schmitt trigger 47 of FIG. 13 is connected from junction 72' in FIG. 12 to a junction 91 in FIG. 12.

Schmitt trigger 47 in FIG. 12 also has junctions 92 and 93. Schmitt trigger 47 also has an amplifier 94 with an inverting input connected from junction 91, and a noninverting input connected from junction 92. Junctions 92 and 79' are connected together. A resistor 95 is connected between junctions 91 and 92. A resistor 96 is connected between junctions 79' and 93. Amplifier 94 has a positive power input lead 95 connected from junction 90 and a negative power input lead 96 connected to junction 85.

As indicated previously, junctions 85, 86 and 87 are all connected to output terminal 88. Power supply 89 contains a junction 97 connected from power supply terminal 73'. A capacitor 98' is connected between junctions 86 and 97. A transistor 98 is provided including a collector 99, an emitter 100 and a base 101. Emitter 100 is connected to junction 97.

Power supply 89 has other junctions 102, 103 and 104. A resistor 105 is connected between junctions 102 and 104. Collector 99 is connected to junction 102. Base 101 is connected to junction 104. Junctions 102 and 103 are connected together. A zener diode 106 is connected to be back biased from junction 104 to junction 87. The invention is provided with a second output terminal 107. A diode 108 is connected from output terminal 107 to junction 103 and poled in a direction toward junction 103.

The output voltage of Schmitt trigger 47 at junction 93 therein is a voltage pulse which is converted to a current pulse by a voltage-to-current converter 48 shown in FIG. 12 having an input lead 108' connected from junction 93 in Schmitt trigger 47. Converter 48 is provided with a junction 109, and a junction 110. Converter 48 also is provided with a transistor 111 having a collector 112, an emitter 113 and a base 114. A resistor 115 is connected from lead 108' to junction 110. Base 114 is also connected to junction 110. A resistor 116 is connected between junctions 109 and 110. Emitter 113 is connected from junction 109. A resistor 117 is connected from collector 112 to junction 87.

Normally the customer provides the equipment connected to the right of output terminals 88 and 107. However, the manufacturer may do so. As is conventional, the use of voltage-to-current converter 48 is made because lead lines 118 and 119 will not, thereby, introduce errors if such lead lines 118 and 119 are changed in length or have an unusually long length.

A source of potential 120 and a resistor 121 are connected in series in succession in that order from lead 118 to lead 119.

Junctions are provided at 122 and 123. Resistor 121 is connected between junctions 122 and 123. Source 120 is thus connected between lead 118 and junction 122, junction 123 and lead 119 being connected together.

A pulse counter 124 is provided having input leads 125 and 126 connected from divider 127. Divider 127 has input leads 128 and 129 connected respectively from junctions 122 and 123. An indicator 130 is connected from pulse counter 124. Divider 127, pulse counter 124 and indicator 130 may be entirely conventional. Divider 127 may be omitted in some cases. Divider 127 may be employed to calibrate the instrument so that indicator 130 reads total flow in conventional or other units of volume.

One explanation of why oscillator 38 undergoes a frequency shift can be explained from FIG. 13 wherein a source of potential 131, a inductor 132 of inductance L, a resistor 133 of resistance R and a capacitor 134 of capacitance C are connected in series in succession in the order stated, capacitor 134 having one electrode 135 connected to a terminal 136 of source 131.

The circuit of FIG. 13 will ring under a certain condition. This condition is:

$$4L/R^2C > 1$$

The frequency $f$ at which the circuit of FIG. 13 rings under the aforesaid condition is as follows:

$$f = \sqrt{(1/LC) - (R^2/4L^2)}$$

From the immediately preceding expression of $f$, it will be apparent that the ringing frequency is a function of R, the loss in the oscillator 38. This loss is changed when a turbine blade 28 passes core 26 and coil 31 because eddy currents are induced in blade 28, and blade 28 has some finite resistance. This resistance may be relatively low or relatively high.

The relative dimensions of core 26 may be as illustrated in the drawings. These dimensions are not critical. However, as an example only, the outside diameter of the core 26 may be 0.35 inch.

In accordance with the present invention, each component part disclosed herein need not necessarily be employed. Many components may, in some cases, be omitted. Other components not disclosed herein may also be substituted for those components which are disclosed herein.

Note will be taken that the turbine flowmeter of the present invention and several of the components thereof may be used individually for other purposes. The utility of the present invention is set forth in connection with FIG. 12 wherein indicator 130 shows total volume flow. Nevertheless, the turbine flowmeter and components thereof of the present invention may be employed in a process controller or otherwise with or without an indicator such as indicator 130 and with or without other structures disclosed herein.

Oscillator 38 may, for example, ring at a frequency of 200 kilohertz. However, this frequency is by no means critical. Oscillator 38 may or may not have a frequency shift of less than 1 percent when a turbine blade 28 passes core 26 and coil 31.

Note will be taken that the construction of the turbine flowmeter and components of the present invention do not rely upon a linkage of magnetic flux between core 26 and blade 28.

What is claimed is:

1. A turbine flowmeter comprising: a non-magnetic conduit; a rotor having non-magnetic conductive blades; mounting means fixed in said conduit holding said rotor in a position rotatable in response to a flow of fluid in said conduit; an input oscillator including a tank circuit having a coil and an output, said coil being fixed relative to said conduit outside thereof and having an axis extending generally normal to the length of said conduit in a position such that all of said blades pass one end of said coil when said rotor is turned one revolution; a phase lock loop having an input and an output, the output of said input oscillator being connected to the input of said phase lock loop, said phase lock loop producing a time varying signal at its output when a blade passes said coil; and output means connected from said phase lock loop output for producing a pulse each time a blade passes said coil.

2. The invention as defined in claim 1, including a pulse counter connected from said output means to count said pulses.

3. The invention as defined in claim 2, including register means to indicate the count stored in said counter.

4. The invention as defined in claim 3, wherein said output means, said pulse counter and said register means are constructed to cause said register means to indicate the total flow through said conduit in units of volume.

* * * * *